US012596360B2

(12) United States Patent     (10) Patent No.:   US 12,596,360 B2

Heller et al.     (45) Date of Patent:    Apr. 7, 2026

(54) DATA-REDUCED EDGE-TO-CLOUD TRANSMISSION BASED ON PREDICTION MODELS

(71) Applicant: WAGO Verwaltungsgesellschaft mbH, Minden (DE)

(72) Inventors: Michael Heller, St. Georgen (DE); Raphael Goj, St. Georgen (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 538 days.

(21) Appl. No.: 17/895,839

(22) Filed: Aug. 25, 2022

(65) Prior Publication Data

US 2022/0413477 A1     Dec. 29, 2022

Related U.S. Application Data

(63) Continuation of application No. PCT/EP2021/050516, filed on Jan. 13, 2021.

(30) Foreign Application Priority Data

Feb. 26, 2020    (DE) ..................... 10 2020 202 463.4

(51) Int. Cl.
    *G05B 19/418*     (2006.01)
(52) U.S. Cl.
    CPC ................. *G05B 19/41885* (2013.01); *G05B 2219/23456* (2013.01)
(58) Field of Classification Search
    None
    See application file for complete search history.

(56) References Cited

U.S. PATENT DOCUMENTS

| | | |
|---|---|---|
| 5,386,373 A | 1/1995 | Keeler et al. |
| 8,606,544 B2 | 12/2013 | Miller et al. |
| 9,110,452 B2 | 8/2015 | Blevins et al. |
| 10,140,253 B2 | 11/2018 | Blevins et al. |

(Continued)

FOREIGN PATENT DOCUMENTS

| | | |
|---|---|---|
| DE | 102012108760 A1 | 5/2013 |
| DE | 102017124884 A1 | 4/2018 |
| WO | WO2019162648 A1 | 8/2019 |

OTHER PUBLICATIONS

Wang, Ji, et al. "Not just privacy: Improving performance of private deep learning in mobile cloud." Proceedings of the 24th ACM SIGKDD international conference on knowledge discovery & data mining. 2018. (Year: 2018).*

(Continued)

*Primary Examiner* — Carlos R Ortiz Rodriguez

(74) *Attorney, Agent, or Firm* — Muncy, Geissler, Olds & Lowe, P.C.

(57) ABSTRACT

A method for providing process data of a device in an industrial automation environment to a computer system. In one embodiment, the method includes the following steps: executing a process data model on the device for generating estimated process data; determining that the estimated process data deviates from the real process data by more than a threshold value; and only if the estimated process data deviates from the real process data by more than the threshold value: transmitting information representing the real process data from the device to the computer system.

12 Claims, 3 Drawing Sheets

(56)                    References Cited

U.S. PATENT DOCUMENTS

| | | | |
|---|---|---|---|
| 10,877,465 | B2 | 12/2020 | Nixon et al. |
| 2014/0365195 | A1 | 12/2014 | Lahiri et al. |
| 2019/0050987 | A1* | 2/2019 | Hsieh ..................... G16H 30/40 |
| 2020/0160207 | A1* | 5/2020 | Song ................... G06F 11/3466 |

OTHER PUBLICATIONS

Teerapittayanon, Surat, Bradley McDanel, and Hsiang-Tsung Kung. "Distributed deep neural networks over the cloud, the edge and end devices." 2017 IEEE 37th international conference on distributed computing systems (ICDCS). IEEE, 2017. (Year: 2017).*

Pranatyasto, Toto Nugroho, and S. Joe Qin. "Sensor validation and process fault diagnosis for FCC units under MPC feedback." Control Engineering Practice 9.8 (2001): 877-888. (Year: 2001).*

Langone, Rocco, et al. "Alarm prediction in industrial machines using autoregressive LS-SVM models." 2014 IEEE symposium on computational intelligence and data mining (CIDM). IEEE, 2014. (Year: 2014).*

Lenz, Ian, et al. "DeepMPC: Learning latent nonlinear dynamics for real-time predictive control." Proc. Robot. Sci. Syst . . . 2015. (Year: 2015).*

Zhang, Xiangyu, et al. "A power disaggregation approach to identify power-temperature models of HVAC units." 2018 IEEE international smart cities conference (ISC2). IEEE, 2018. (Year: 2018).*

Lanzetti, Nicolas, et al. "Recurrent neural network based MPC for process industries." 2019 18th European Control Conference (ECC). IEEE, 2019. (Year: 2019).*

Zhang, Xiangyu, et al. "An IoT-based thermal model learning framework for smart buildings." IEEE Internet of Things Journal 7.1 (2019): 518-527. (Year: 2019).*

Wang, Chao, et al. "Anomaly detection for industrial control system based on autoencoder neural network." Wireless Communications and Mobile Computing Jan. 2020 (2020): 8897926. (Year: 2020).*

Zhang, Xiangyu, et al. "An edge-cloud integrated solution for buildings demand response using reinforcement learning." IEEE Transactions on Smart Grid 12.1 (2020): 420-431. (Year: 2020).*

International Search Report dated Apr. 20, 2021 in corresponding application PCT/EP2021/050516.

A. Ghosh et al: "Deep Learning: Edge Cloud Data Analytics for IoT" Department of Electrical and Computer Engineering, Western University, London, ON, Canada, May 2019.

* cited by examiner

DATA-REDUCED EDGE-TO-CLOUD TRANSMISSION BASED ON PREDICTION MODELS

This nonprovisional application is a continuation of International Application No. PCT/EP2021/050516, which was filed on Jan. 13, 2021, and which claims priority to German Patent Application No. 10 2020 202 463.4, which was filed in Germany on Feb. 26, 2020, and which are both herein incorporated by reference.

BACKGROUND OF THE INVENTION

Field of the Invention

The present invention relates to the field of industrial automation technology and, in particular, methods and techniques for data-reduced transmission between edge devices and cloud systems based on prediction models.

Description of the Background Art

During the course of the Fourth Industrial Revolution and the all-pervasive digital transformation as well as, and in particular, in industrial automation technology, cloud solutions are increasingly being used to analyze, manage and possibly even control the automation environment and its components. Within a cloud system, the received data is usually stored, evaluated and made available to the users in prepared form for any type of terminal. It is also possible to send data (e.g., commands, firmware updates) from the cloud system to the components or devices of an automation environment. The connection between the devices and the cloud system(s) may be designed to be wirebound or wireless (e.g., via mobile radio technologies).

In this context, the devices within the automation environment are often also referred to as edge devices. An edge device is generally to be understood to be a device, which may be connected to a remote computer system, in particular a cloud system, but nevertheless carries out local and therefore decentralized data processing, for example, to prepare data prior to being transmitted to the cloud or to the remote computer system.

However, sending data from devices to cloud systems and the data link needed for this purpose are afflicted with negative characteristics. For example, transmitting data in the industrial context is often associated with use-dependent costs, i.e., the more data that are transmitted, the more expensive this may become. The costs result, for example, from the arising traffic and/or the number of incoming messages to the cloud system.

In addition, the data transmission rate is often physically limited, which means that an arbitrary volume of data may not be transmitted. The more devices that share a connection, the lower is the possible data transmission rate.

In the context of the Internet, in particular, but also in an intranet, a data link may also be impaired by outages.

One way to overcome these disadvantages is disclosed, for example, by the document, "Deep Learning: Edge Cloud Data Analytics for IoT" by A. Ghosh et al. (Department of Electrical and Computer Engineering, Western University, London, ON, Canada, May 2019). The document discloses a method, in which sensor data are received by an edge device, reduced within the edge device, and subsequently transmitted to the cloud. Here, the reduced data are converted back into the original data.

SUMMARY OF THE INVENTION

It is therefore an object of the present invention to provide techniques for transmitting data from an industrial automation environment to a computer system, which at least partially overcome the negative effects of the characteristics of the prior art described above.

In an exemplary embodiment, a method is provided for providing process data of a device in an industrial automation environment to a computer system. A process data model is executed on the device for the purpose of generating particular estimated process data. The process data model is preferably also executed on the computer system, so that estimated process data are also generated there. It is also determined (for example, on the device) whether the estimated process data deviate from the real process data by more than a threshold value. Only if the estimated process data deviate from the real process data by more than the threshold value is information representing the real process data transmitted from the device to the computer system.

As described at the outset in reference to the prior art, a computer system would usually use real process data, which it has received from the device in the automation environment. The invention deviates therefrom in that the computer system now initially uses estimated process data, which were generated by a process data model, instead of real process data. In other words, the computer system works to a certain extent on a simulation of the real process data.

To prevent the process data model from supplying inaccurate estimated process data, the invention further provides for also executing the process data model on the device, so that the estimated process data may be compared with the real process data. In the case of too great a deviation (it also being possible for the aforementioned threshold value to be zero, i.e., in the case of some other small deviation), information representing the real process data is transmitted from the device to the computer system. This information is preferably transmitted only if the deviation occurs, i.e., during normal operation (while the computer system is working on the basis of the process data model), no information is transmitted from the device to the computer system.

This is technically advantageous in several respects: the better the process data model, the less information needs to be transmitted from the device to the computer system or the less often does it have to be transmitted. This results in significant savings when it comes to exchanging data. Fewer data transmissions result in lower costs for traffic and incoming messages to the computer system; the transmission time for the data from the device to the computer system is also largely eliminated, which may result in shorter response times; due to the fact that the data no longer has to be sent continuously, the consequences of a data theft may possibly be less severe, since the person intercepting the data is able to seize only a portion of the data; and if the data transmission is interrupted, this is only relevant if the real process data deviate from the estimated process data. The comparison must then take place at a later point in time when the data transmission is functioning again.

In an aspect of the invention, the information representing the real process data may comprise the real process data. In other words, in the case of a deviation between the process data model and the real process data, the real process data themselves are sent to the computer system.

Alternatively, the information representing the real process data may also include reconstruction data, the reconstruction data allowing the computer system to reconstruct the real process data from the estimated process data. For example, the reconstruction data may comprise difference values.

A further aspect of the present invention, which is advantageous in combination with the above aspects as well as on its own, relates to the generation of the process data model by a machine learning system based on real process data. The machine learning system is preferably arranged in the computer system or a second computer system. The process data model may then be generated on the device, and if the process data model was generated on the second computer system, it may be transmitted to the computer system.

If the estimated process data deviates from the real process data by more than the threshold value, it is also possible to retrain the process data model and to update the process data model accordingly on the device and on the computer system.

The device may comprise an edge device, a field device a control device and/or a programmable logic controller (e.g., WAGO PFC controller, WAGO touch panel). Sensors and/or actuators may usually be connected to a device of this type, and the latter may be used to implement the various tasks in the context of automation technology.

The computer system may comprise, in particular, a cloud system and/or a server; the same also applies to the second computer system. The computer system and/or the second computer system is/are preferably located at a distance from the device. Examples of cloud systems are WAGO Cloud, Microsoft Azure, Amazon AWS, SAP Cloud and/or IMB Cloud, this list not intending to be exhaustive.

The invention also provides a computer program including instructions for implementing any of the above methods and their different aspects, as well as a device and a computer system for use in one of the described methods. Finally, the invention also relates to a system, which comprises a device and a computer system as described, the system, being configured to carry out any of the above methods.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 3:
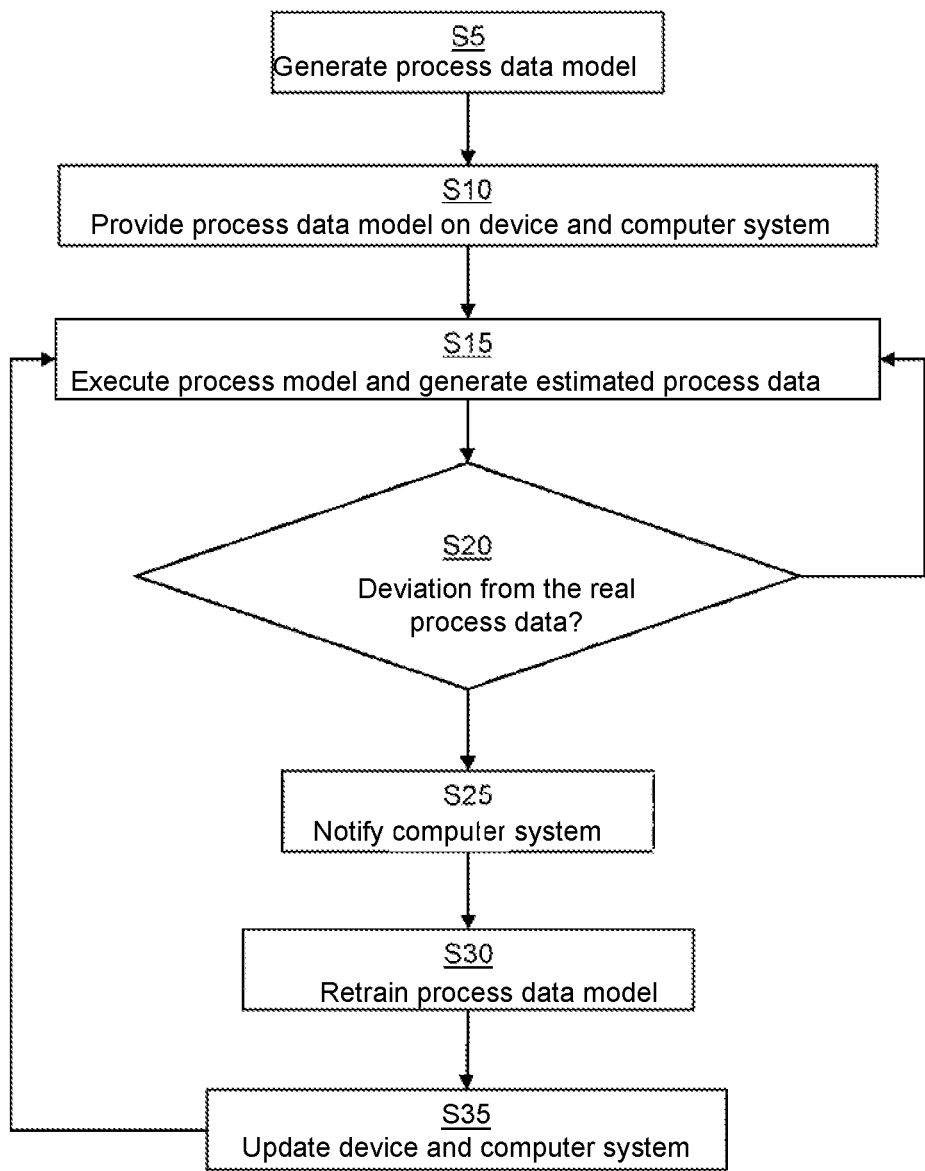
FIG. 3 shows a flowchart of a method according to an example of the invention.

The currently preferred exemplary embodiments of a method according to the invention for the reduced data transmission between a device and a computer system are explained in greater detail below with reference to FIG. 3.

Figure 1A:
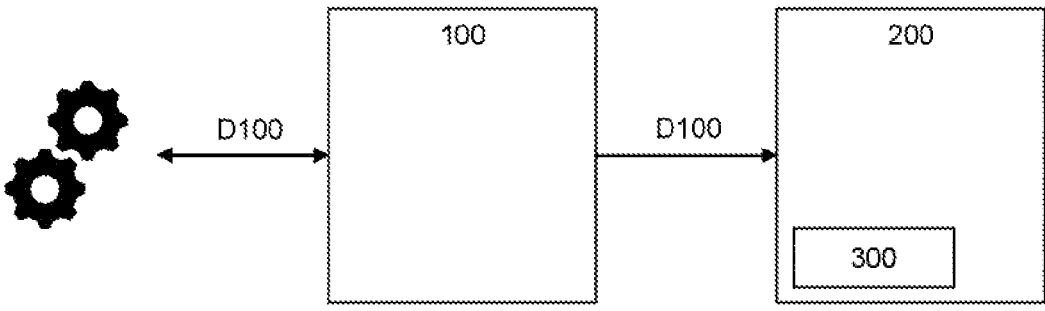
FIGS. 1a to 1c show an example of the invention, in which the machine learning system is integrated into the remote computer system.

In a preparation phase, which is illustrated in FIG. 1a, real process data D100, which are generated, for example, in the context of an automated system, are first collected and, on this basis, a prediction model 400 (also referred to as a process data model) is generated (cf. step S5 in FIG. 3), which is then able to predict the (future) process data. Process data model 400 is preferably a (mathematical or statistical) model for simulating real process data. Prediction model 400 is preferably generated within a cloud system 200, based on a machine learning system 300. Cloud systems are particularly suitable for this purpose, since they may provide the necessary IT resources as needed.

Machine learning system 300 may be based on different algorithms, each of which is used depending on the problem. In one preferred implementation, a structurally predefined statistical model is trained on the basis of input/output data pairs. A portion of the data points iteratively runs through the model. The learning algorithm may adapt the model step by step, based on the deviation between the calculated results and the expected results. Suitable techniques from machine learning and artificial intelligence may be used for this purpose. One objective of a monitored learning of this type is that the network is trained to be able to establish associations after multiple computing passes using different inputs and outputs.

Figure 1B:
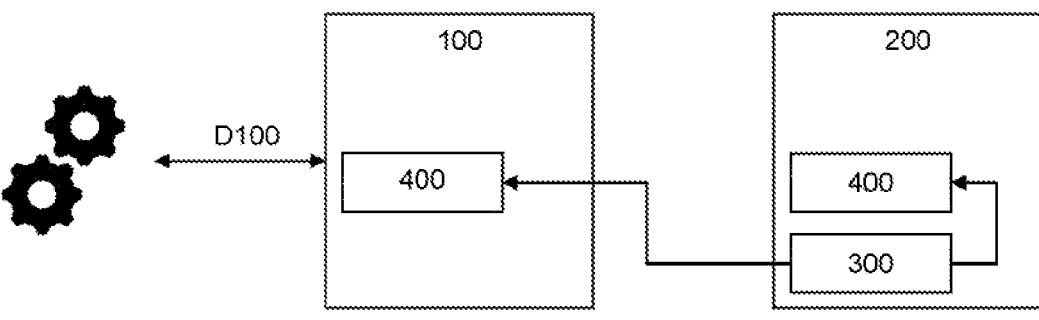

Prediction model 400 is subsequently distributed to edge device 100 in step S10, as illustrated in FIG. 1b.

At runtime (cf. FIG. 1c), process data model 400 is preferably executed in step S15 in parallel in both cloud system 200 and on edge device 100, and prediction data D200 are generated for the corresponding process data. Data D200 are thus estimated process data.

In step S20, a (continuous) comparison between actual process data D100 of the real process and estimated process data D200, which prediction model 400 generates, additionally takes place on edge device 100.

If a deviation between real process data D100 and process data D200 of prediction model 400 is determined on edge device 100 (it being possible to set a certain deviation tolerance here using a threshold value), this means that predicted process data D200 are no longer correct within cloud system 200. To have correct process data present within cloud system 200 at any time, either real process data D100 must be transmitted to cloud system 200 in a case of this type (cf. step S25), or so-called reconstruction data D300 must be sent, which are used to reconstruct the process data from prediction model 400 (e.g., based on differences), so that these data subsequently correspond to real process data D100.

Figure 1C:
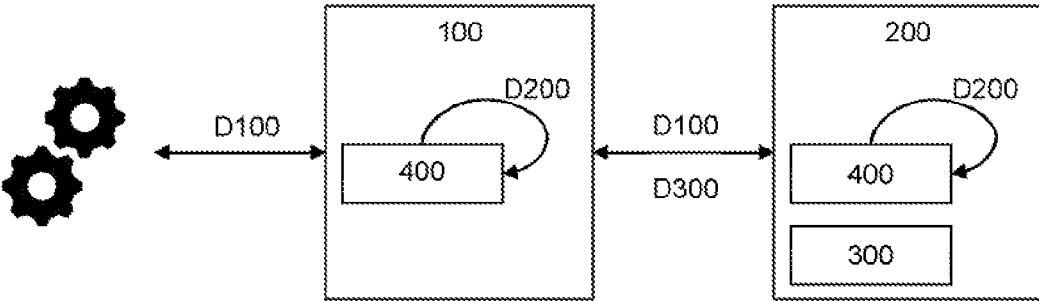

It is understood that the preparation phase illustrated in FIGS. 1a and 1b (cf. steps S5 and S10 in FIG. 3) is functionally independent of the runtime phase illustrated in FIG. 1c (cf. steps S15 through S25 in FIG. 3), i.e., process data model 400 may also originate in another source or have been generated in a different way.

Prediction model 400 may possibly also be retrained in step S30 and be updated on edge device 100 as well as in cloud system 200 in step S35 for the purpose of keeping its prediction accuracy as high as possible, which may decrease due to seasonalities or changed environmental conditions.

Figure 2A:
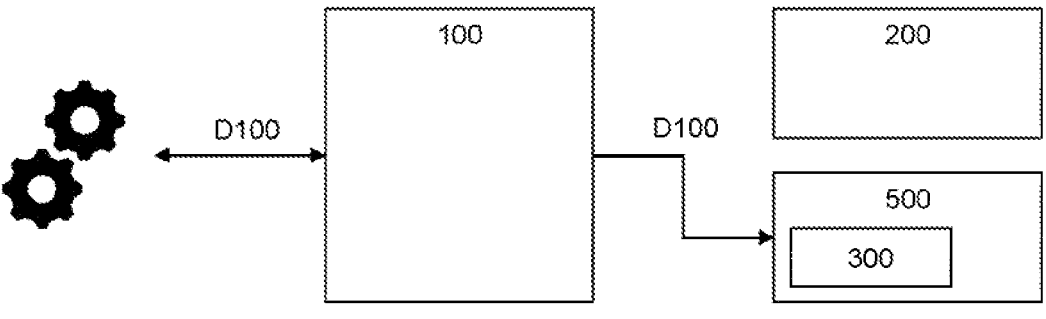
FIGS. 2a to 2c show an example including an external machine learning system.
Figure 2B:
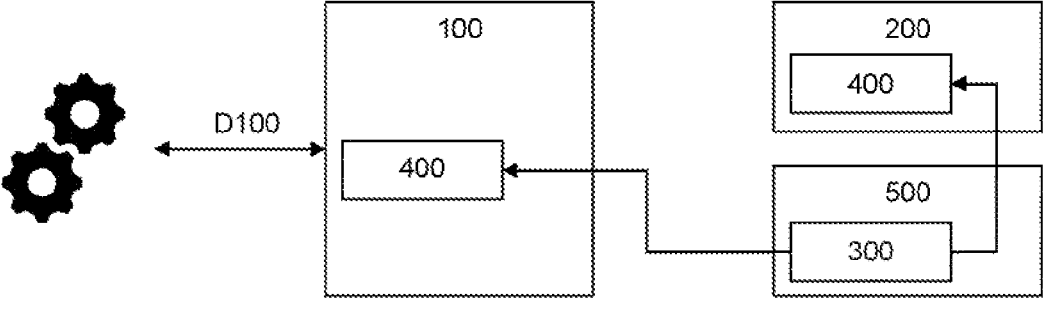
Figure 2C:
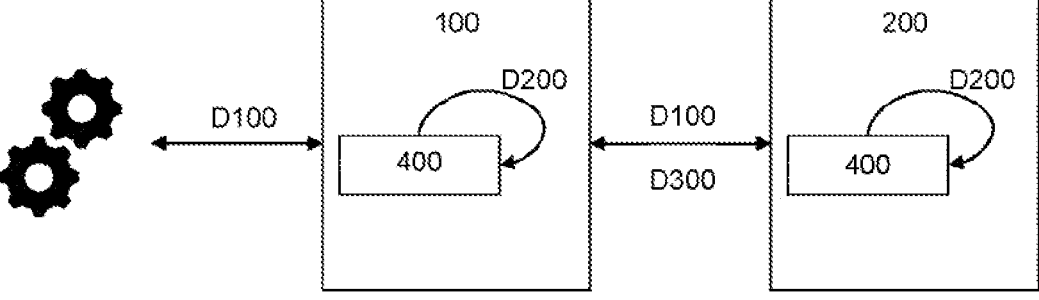

As illustrated in FIGS. 2a through c, the operation of machine learning system 300 and the generation of prediction model 400 may also take place on a separate (cloud) system 500. Cloud system 500 may be used from the outside as well as be operated internally. A cloud system 200 or 500 may possibly also be represented by a conventional server.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for providing process data of a device in an industrial automation environment to a computer system, the method comprising:

executing a process data model on the device to generate estimated process data, the computer system also executing the process data model to generate corresponding estimated process data;

determining whether the estimated process data deviates from real process data by more than a threshold value; and transmitting, only when the estimated process data deviates from the real process data by more than the threshold value, information representing the real process data from the device to the computer system.

2. The method according to claim 1, wherein the information representing the real process data comprises the real process data.

3. The method according to claim 1, wherein the information representing the real process data comprises reconstruction data, the reconstruction data allowing the computer system to reconstruct the real process data from the estimated process data.

4. The method according to claim 3, wherein the reconstruction data comprise difference values.

5. The method according to claim 1, wherein the determination is carried out on the device.

6. The method according to claim 1, further comprising:

generating the process data model via a machine learning system based on real process data, the machine learning system being arranged in the computer system or in a second computer system.

7. The method according to claim 6, further comprising:

transmitting the process data model to the device and, when the process data model was generated on the second computer system, transmitting the process data model to the computer system.

8. The method according to claim 1, further comprising:

retraining, when the estimated process data deviates from the real process data by more than the threshold value, the process data model and updating the process data model on the device and on the computer system.

9. The method according to claim 6, wherein the device comprises an edge device, a field device, a control device and/or a programmable logic controller; and/or wherein the computer system comprises a cloud system and/or a server; and/or wherein the second computer system comprises a cloud system and/or a server; and/or wherein the computer system and/or the second computer system is or are located at a distance from the device.

10. A non-transitory computer readable medium device containing program instructions to implement the method according to claim 1.

11. A system comprising a device and a computer system, wherein the system is configured to carry out the method claim 1.

12. The method according to claim 1, further comprising:

generating the process data model via a machine learning system based on real process data, the machine learning system being arranged in a second computer system; and transmitting the process data model to the device and transmitting the process data model to the computer system.

* * * * *